United States Patent
Byers

(10) Patent No.: US 11,097,682 B2
(45) Date of Patent: Aug. 24, 2021

(54) AIRBAG CHUTE ASSEMBLY

(71) Applicant: GM Global Technology Operations LLC, Detroit, MI (US)

(72) Inventor: Charles P. Byers, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 48 days.

(21) Appl. No.: 16/692,268

(22) Filed: Nov. 22, 2019

(65) Prior Publication Data

US 2021/0155198 A1   May 27, 2021

(51) Int. Cl.
*B60R 21/2165* (2011.01)
*B60R 21/215* (2011.01)

(52) U.S. Cl.
CPC ... *B60R 21/2165* (2013.01); *B60R 2021/21537* (2013.01)

(58) Field of Classification Search
CPC .......... B60R 21/2165; B60R 2021/21537
See application file for complete search history.

(56) References Cited

U.S. PATENT DOCUMENTS

| | | | |
|---|---|---|---|
| 6,565,116 B1* | 5/2003 | Tajima | B60R 13/0206 24/297 |
| 2003/0047915 A1* | 3/2003 | Sun | B60R 21/205 280/728.2 |
| 2003/0184063 A1* | 10/2003 | Yasuda | B29C 66/73921 280/732 |
| 2004/0026902 A1* | 2/2004 | Yasuda | B29C 66/112 280/728.2 |
| 2004/0056455 A1* | 3/2004 | Nishijima | B60R 21/2165 280/728.3 |
| 2005/0269804 A1* | 12/2005 | Yamada | B29C 66/54 280/728.3 |
| 2014/0203540 A1* | 7/2014 | Edeline | B60R 21/215 280/728.3 |
| 2016/0288381 A1* | 10/2016 | Lard | B60R 21/2165 |
| 2018/0281729 A1* | 10/2018 | Asakuma | B60R 21/206 |

* cited by examiner

*Primary Examiner* — Drew J Brown

(57) ABSTRACT

An airbag chute assembly for an automotive vehicle includes a rigid chute frame, a door, and at least one hinge interconnecting the door to the rigid chute frame, wherein, the rigid chute frame and the door are unitarily injection molded from a single material.

15 Claims, 1 Drawing Sheet

AIRBAG CHUTE ASSEMBLY

INTRODUCTION

The present disclosure relates to an airbag chute assembly for an automotive vehicle.

Airbags are a common safety device used in automobiles to prevent injury to the vehicle passengers when an accident occurs. Typically, airbags are integrated into the steering wheel or the dashboard and deploy when the vehicle is in a collision. If a vehicle is hit head-on, the momentum of the driver and passenger will be absorbed by the airbag, and the driver and passenger will avoid hitting the steering wheel and dashboard, respectively.

Upon being discharged, the airbag, is directed through a chute and into the passenger compartment through an opening formed in the instrument panel. An airbag chute assembly typically includes a door, a chute or frame, and a hinge to attach the door to the chute or frame, and features for attaching the airbag module assembly. In addition, when the airbag chute assembly is mounted behind a foam in place instrument panel, tape or a seal gasket must be used to prevent liquid foam from leaking between the airbag chute assembly and the instrument panel structure. In many instances, the airbag chute assembly is secured to the structure of the instrument panel by a weld process, and the airbag module is fastened to the airbag chute assembly by at least one fastener.

Although adequate for most applications, these airbag chute assemblies include many components. Additionally, the conventional assembly may include dissimilar materials, which may increase manufacturing complexities. Thus, while current airbag chute assemblies achieve their intended purpose, there is a need for an improved airbag chute assembly that reduces the number of parts, materials, and manufacturing operations.

SUMMARY

According to several aspects of the present disclosure, an airbag chute assembly for an automotive vehicle includes a rigid chute frame, a door, and at least one hinge interconnecting the door to the rigid chute frame, wherein, the rigid chute frame and the door are unitarily injection molded from a single material.

According to another aspect, the rigid chute frame and the door are made from a thermoplastic polyolefin material.

According to another aspect, the at least one hinge extends along a first portion of an outer periphery of the door, the airbag chute assembly further including a tear seam extending around a second portion of the outer periphery of the door and interconnecting the door to the rigid chute frame, the tear seam having a residual wall thickness geometry adapted to allow the tear seam to separate, detaching the second portion of the outer periphery of the door from the rigid chute frame during deployment of an airbag.

According to another aspect, the tear seam is unitarily formed along with the rigid chute frame and the door from a thermoplastic polyolefin material.

According to another aspect, the door includes a first door section and a second door section, the at least one hinge includes a first hinge interconnecting the first door section to the rigid chute frame along a first edge of the first door section, and a second hinge interconnecting the second door section to the rigid chute frame along a first edge of the second door section, and the tear seam extends between and interconnecting the first door section to the rigid chute frame along second and third sides of the first door section, between and interconnecting the second door section to the rigid chute frame along second and third sides of the second door section, and between and interconnecting the first door section to the second door section along fourth sides of the first and second door sections.

According to another aspect, the airbag chute assembly further includes a seal off rib extending outward from a front surface of the rigid chute frame and extending around the door.

According to another aspect, the seal off rib is unitarily formed along with the rigid chute frame and the door from a thermoplastic polyolefin material.

According to another aspect, the front surface of the airbag chute assembly is adapted to be vibration welded to an inner surface of an instrument panel structure, and the seal off rib is adapted to provide a seal between the inner surface of the instrument panel structure and the airbag chute assembly when the airbag chute assembly is vibration welded to the inner surface of the instrument panel structure.

According to another aspect, the rigid chute frame includes a plurality of mounting studs adapted to support an airbag module.

According to another aspect, the mounting studs are insert molded into the rigid chute frame.

According to another aspect, the rigid chute frame includes a structure that is substantially rigid and the at least one hinge has a residual wall thickness geometry that is adapted to prevent the at least one hinge from tearing during deployment of an airbag and to allow the door to swing outward during deployment of the airbag.

According to several aspects of the present disclosure, an instrument panel for an automotive vehicle having an airbag chute assembly includes an outer skin, an instrument panel structure having an opening formed therein adapted to allow an airbag chute assembly to extend outward through the opening, a foam in place filler between the outer skin and the instrument panel structure, and an airbag chute assembly aligned with the opening within the instrument panel structure and vibration welded to an inner surface of the instrument panel structure, the airbag chute assembly including a rigid chute frame, a door, and at least one hinge interconnecting the door to the rigid chute frame, wherein, the rigid chute frame and the door are unitarily injection molded from a thermoplastic polyolefin material.

According to another aspect, the at least one hinge extends along a first portion of an outer periphery of the door, the airbag chute assembly further including a tear seam unitarily formed along with the rigid chute frame and the door from a thermoplastic polyolefin material, the tear seam extending around a second portion of the outer periphery of the door and interconnecting the door to the rigid chute frame, the tear seam having a residual wall thickness geometry adapted to allow the tear seam to separate, detaching the second portion of the outer periphery of the door from the rigid chute frame during deployment of an airbag.

According to another aspect, the door includes a first door section and a second door section, the at least one hinge includes a first hinge interconnecting the first door section to the rigid chute frame along a first edge of the first door section, and a second hinge interconnecting the second door section to the rigid chute frame along a first edge of the second door section, and the tear seam extends between and interconnecting the first door section to the rigid chute frame along second and third sides of the first door section, between and interconnecting the second door section to the rigid chute frame along second and third sides of the second door section, and between and interconnecting the first door section to the second door section along fourth sides of the first and second door sections.

According to another aspect, the airbag chute assembly further includes a seal off rib unitarily formed along with the rigid chute frame and the door from a thermoplastic polyolefin material and extending outward from a front surface of the rigid chute frame and extending around the door.

According to another aspect, the front surface of the airbag chute assembly is vibration welded to the inner surface of an instrument panel structure, and the seal off rib is adapted to provide a seal between the inner surface of the instrument panel structure and the airbag chute assembly to prevent the foam in place filler from leaking between the airbag chute assembly and the inner surface of the instrument panel.

According to another aspect, the rigid chute frame includes a plurality of insert molded mounting studs adapted to support an airbag module.

According to another aspect, the rigid chute frame includes a structure that is substantially rigid and the at least one hinge has a residual wall thickness geometry that is adapted to prevent the at least one hinge from tearing during deployment of an airbag and to allow the door to swing outward during deployment of the airbag.

According to several aspects of the present disclosure, an airbag chute assembly for an automotive vehicle includes a rigid chute frame having a structure that is substantially rigid, a door, at least one hinge extending along a first portion of an outer periphery of the door and interconnecting the door to the rigid chute frame, the at least one hinge having a residual wall thickness geometry that is adapted to prevent the at least one hinge from tearing during deployment of an airbag and to allow the door to swing outward during deployment of the airbag, a tear seam extending around a second portion of the outer periphery of the door and interconnecting the door to the rigid chute frame, the tear seam having a residual wall thickness geometry adapted to allow the tear seam to separate, detaching the second portion of the outer periphery of the door from the rigid chute frame during deployment of an airbag, a seal off rib extending outward from a front surface of the rigid chute frame and extending around the door, the front surface of the airbag chute assembly adapted to be vibration welded to an inner surface of an instrument panel structure, and the seal off rib is adapted to provide a seal between the inner surface of the instrument panel structure and the airbag chute assembly when the airbag chute assembly is vibration welded to the inner surface of the instrument panel structure, and a plurality of mounting studs insert molded into the rigid chute frame and adapted to support an airbag module, wherein, the rigid chute frame, the door, the tear seam and seal off rib are unitarily injection molded from a thermoplastic polyolefin material.

According to another aspect, the door includes a first door section and a second door section, and the at least one hinge includes a first hinge interconnecting the first door section to the rigid chute frame along a first edge of the first door section, and a second hinge interconnecting the second door section to the rigid chute frame along a first edge of the second door section, and the tear seam extends between and interconnecting the first door section to the rigid chute frame along second and third sides of the first door section, between and interconnecting the second door section to the rigid chute frame along second and third sides of the second door section, and between and interconnecting the first door section to the second door section along fourth sides of the first and second door sections.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
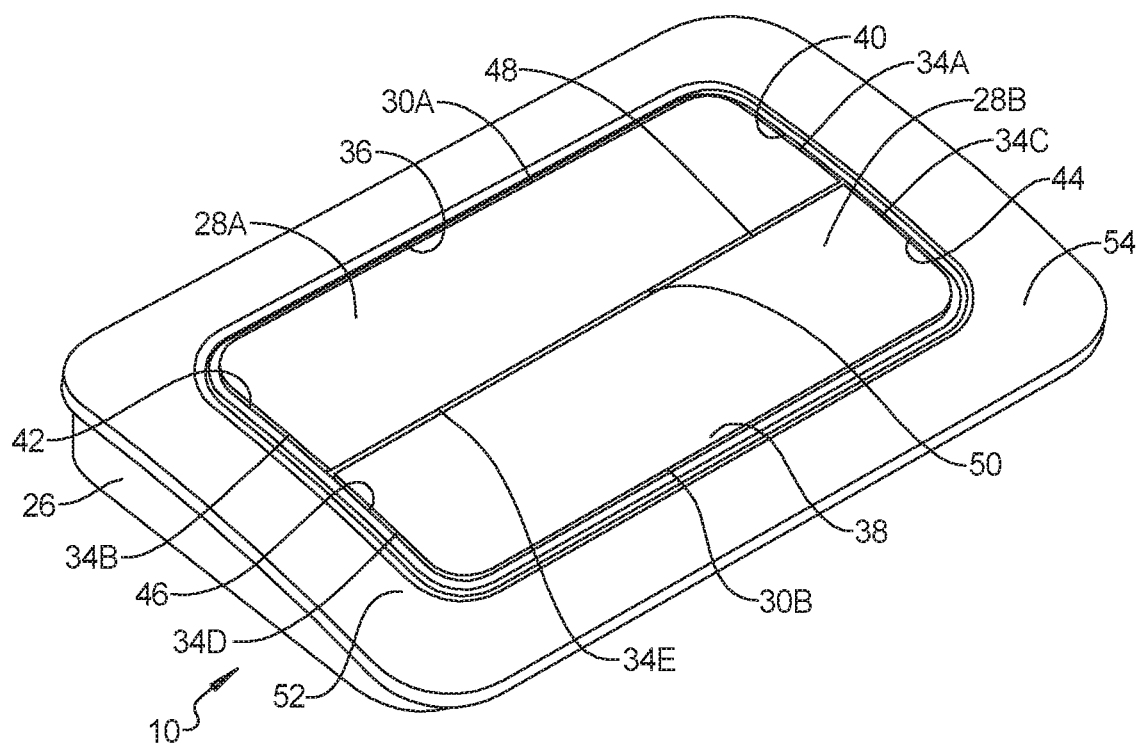
FIG. 1 is a perspective view of an airbag chute assembly according to an exemplary embodiment.
Figure 2:
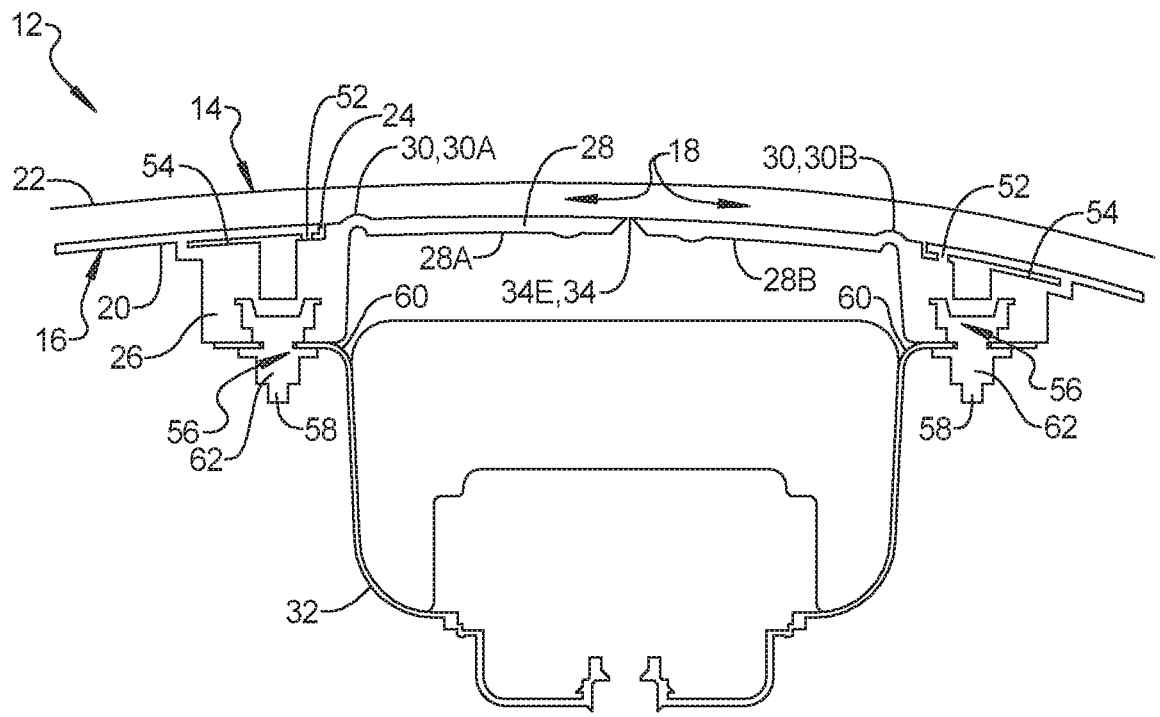
FIG. 2 is a sectional view of an instrument panel including an airbag chute assembly according to an exemplary embodiment.

Referring to FIG. 1 an airbag chute assembly 10 in accordance with an exemplary embodiment of the present disclosure is shown. Referring to FIG. 2, an instrument panel 12 in accordance with an exemplary embodiment of the present disclosure is shown.

The instrument panel 12 includes an outer skin 14, an instrument panel structure 16, a foam in place filler 18 between the outer skin 14 and the instrument panel structure 16, and an airbag chute assembly 10 mounted to an inner surface 20 of the instrument panel structure 16.

The outer skin 14 is formed from a material having an outer surface 22 that provides an aesthetic appearance to the interior of the automobile. It is desirable that the outer surface 22 of outer skin 14 not include scoring or etching to provide clear tear lines to allow an airbag to bust through the outer skin 14 during deployment, therefore, the outer skin 14 is formed from a material having sufficient toughness to provide a resilient surface to the interior of the automobile, while also being able to easily tear when the pressure of the airbag pushes outward from behind the outer skin 14.

The instrument panel structure 16 includes an opening 24 formed therein. The opening 24 provides a pathway for the airbag chute assembly to extend outward through the instrument panel structure 16 when deployed. In an exemplary embodiment, the airbag chute assembly 10 is vibration welded to the inner surface 20 of the instrument panel structure 16 and is aligned with the opening 24 within the instrument panel structure 16.

The airbag chute assembly 10 includes a rigid chute frame 26, a door 28, and at least one hinge 30 interconnecting the door 28 to the rigid chute frame 26. The rigid chute frame 26 the door 28 and the at least one hinge 30 are unitarily injection molded from a single material. In an exemplary embodiment, the rigid chute frame 26, the door 28, and the at least one hinge 30 are unitarily formed from a thermoplastic polyolefin material (TPO) with high elastomeric properties. In another exemplary embodiment, the rigid chute frame 26, the door 28, and the at least one hinge 30 are unitarily formed by a single pass injection molding process.

The airbag chute frame 26 includes a structure that is substantially rigid to provide structural support to secure an airbag module 32 in place and withstand the forces that are experienced during deployment of the airbag. The at least one hinge 30 has a residual wall thickness geometry that is adapted to prevent the at least one hinge 30 from tearing during deployment of the airbag and to allow the door 28 to swing outward during deployment of the airbag.

A TPO material with high elastomeric properties will allow an airbag chute frame 26 constructed with a thick or corrugated structure to exhibit necessary rigidity, while allowing the at least one hinge 30, having an appropriate residual wall thickness geometry to exhibit sufficient strength to prevent the at least one hinge 30 from tearing during deployment of the airbag while having sufficient flexibility to allow the door 28 to swing outward and allow the airbag to deploy outward. Referring to FIG. 2, the at least one hinge 30 is formed with a consistent thickness having a smooth profile that does not create any force concentrations to help ensure that the at least one hinge 30 does not tear during deployment of the airbag.

The at least one hinge 30 extends along a first portion of an outer periphery of the door 28 to secure the door 28 to the airbag chute frame 26. The airbag chute assembly 10 further includes a tear seam 34 extending around a second portion of the outer periphery of the door 28. The tear seam 34 interconnects the door 28 to the rigid chute frame 26. The tear seam 34 is unitarily formed along with the rigid chute frame 26, the door 28, and the at least one hinge 30 from a TPO material. A residual wall thickness geometry of the tear seam 34, along with the characteristics of the TPO material, allow the tear seam 34 to separate when the airbag deploys. The thickness of the tear seam 34 is critical to proper air bag performance. If the residual wall thickness geometry is too thick the air bag may not fully deploy in an emergency, and if the residual wall thickness geometry is too thin the tear seam 34 may separate if the door 28 is bumped or pressed upon during normal driving.

Referring to FIG. 2, the tear seam 34 is formed with a V shape that concentrates tearing forces to the thinnest portion of the tear seam 34. This ensures that the force of the airbag cleanly and completely detaches the second portion of the outer periphery of the door 28 from the rigid chute frame 26 allowing the door 28 to swing outward for proper deployment of the airbag.

Referring to the Figures, in an exemplary embodiment, the door 28 includes a first door section 28A and a second door section 28B. The first and second door sections 28A, 28B are generally rectangular in shape and are positioned adjacent one another along a long side.

The at least one hinge 30 includes a first hinge 30A and a second hinge 30B. The first hinge 30A interconnects the first door section 28A to the rigid chute frame 26 along a first edge 36 of the first door section 28A. The second hinge 30B interconnects the second door section 28B to the rigid chute frame 26 along a first edge 38 of the second door section 28B. It should be understood that the shape of the doors 28A, 28B may be other than rectangular, and may be any shape suitable for a particular application.

The tear seam 34 includes a plurality of segments. A first segment 34A of the tear seam 34 extends between and interconnects the first door section 28A to the rigid chute frame 26 along a second side 40 of the first door section 28A. A second segment 34B of the tear seam 34 extends between and interconnects the first door section 28A to the rigid chute frame 26 along a third side 42 of the first door section 28A. Correspondingly, a third segment 34C of the tear seam 34 extends between and interconnects the second door section 28B to the rigid chute frame 26 along a second side 44 of the second door section 28B. A fourth segment 34D of the tear seam 34 extends between and interconnects the second door section 28B to the rigid chute frame 26 along a third side 46 of the second door section 28B. Finally, a fifth segment 34E of the tear seam 34 extends between and interconnects the first door section 28A to the second door section 28A along fourth sides 48, 50 of the first and second door sections 28A, 28B respectively.

The airbag chute assembly 10 further includes a seal off rib 52. The seal off rib 52 extends outward from a front surface 54 of the rigid chute frame 26 and extends around the door 28. The seal off rib 52 is unitarily formed along with the rigid chute frame 26, the door 28, the at least one hinge 30, and the tear seam 34 from a thermoplastic polyolefin material with high elastomeric properties. The front surface 54 of the airbag chute assembly 10 is vibration welded to the inner surface 20 of the instrument panel structure 16. The seal off rib 52 is adapted to provide a seal between the inner surface 20 of the instrument panel structure 16 and the airbag chute assembly 10.

The foam in place filler 18 between the outer skin 14 and the instrument panel structure 16 is injected between the outer skin 14 and the instrument panel structure 16 as a liquid. Once injected, the liquid expands and eventually solidifies to provide a resilient foam in place filler 18 between the outer skin 14 and the instrument panel structure 16. The seal off rib 52 prevents the liquid foam in place filler 18 from leaking between the airbag chute assembly 10 and the inner surface 20 of the instrument panel structure 16.

Referring to FIG. 2, the rigid chute frame 26 includes a plurality of mounting studs 56. The mounting studs 56 provide a means to fasten an airbag module 32 to the rigid chute frame 26. The mounting studs 56 are insert molded within the rigid chute frame 26 and include features that allow the airbag module 32 to be secured thereto. In an exemplary embodiment, the mounting studs 56 include a threaded shaft 58 that extends through a flange 60 on an airbag module 32. Once the airbag module 32 is in place a nut 62 may be threaded onto the threaded shafts 58 of the mounting studs 56 to secure the airbag module 32 onto the rigid chute frame 26. It is to be understood that other fastening means could be used to secure an airbag module 32 to the rigid chute frame 26 without departing from the scope of the present disclosure.

An airbag chute assembly 10 of the present disclosure offers several advantages. An airbag chute assembly 10 of the present invention provides a more robust product design that is less sensitive to supplier part manufacturing process variation. Using unitarily formed hinges and tear seam provides reliability and repeatability in the manufacturing process that increases the likelihood of successful first-time deployments. Fewer components, and a unitarily formed rigid chute frame 26, door 28, hinges 30 and tear seam 34 result in a lower mass assembly that has better packaging attributes, and less complex manufacturing processes which ultimately result in less cost. An airbag chute assembly 10 in accordance with the present disclosure provides improved packaging, higher reliability, lower cost, and lower mass over prior art airbag chute assemblies.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An airbag chute assembly for an automotive vehicle, comprising:
   a rigid chute frame;
   a door;
   a seal off rib extending outward from a front surface of the rigid chute frame and extending around the door; and
   at least one hinge interconnecting the door to the rigid chute frame;
   wherein, the rigid chute frame, the seal off rib and the door are unitarily injection molded from a single material, and the front surface of the airbag chute assembly is adapted to be vibration welded to an inner surface of an instrument panel structure, and the seal off rib is adapted to provide a seal between the inner surface of the instrument panel structure and the airbag chute assembly when the airbag chute assembly is vibration welded to the inner surface of the instrument panel structure.

2. The airbag chute assembly of claim 1, wherein the rigid chute frame, the seal off rib and the door are made from a thermoplastic polyolefin material.

3. The airbag chute assembly of claim 2, wherein the at least one hinge extends along a first portion of an outer periphery of the door, the airbag chute assembly further including a tear seam extending around a second portion of the outer periphery of the door and interconnecting the door to the rigid chute frame, the tear seam having a residual wall thickness geometry adapted to allow the tear seam to separate, detaching the second portion of the outer periphery of the door from the rigid chute frame during deployment of an airbag.

4. The airbag chute assembly of claim 3, wherein the tear seam is unitarily formed along with the rigid chute frame, the seal off rib and the door from a thermoplastic polyolefin material.

5. The airbag chute assembly of claim 4, wherein:
   the door includes a first door section and a second door section; and
   the at least one hinge includes a first hinge interconnecting the first door section to the rigid chute frame along a first edge of the first door section, and a second hinge interconnecting the second door section to the rigid chute frame along a first edge of the second door section; and
   the tear seam extends:
      between and interconnecting the first door section to the rigid chute frame along second and third sides of the first door section;
      between and interconnecting the second door section to the rigid chute frame along second and third sides of the second door section; and
      between and interconnecting the first door section to the second door section along fourth sides of the first and second door sections.

6. The airbag chute assembly of claim 4, wherein the rigid chute frame includes a plurality of mounting studs adapted to support an airbag module.

7. The airbag chute assembly of claim 6, wherein the mounting studs are insert molded as part of the rigid chute frame.

8. The airbag chute assembly of claim 4, wherein the rigid chute frame includes a structure that is substantially rigid and the at least one hinge has a residual wall thickness geometry that is adapted to prevent the at least one hinge from tearing during deployment of an airbag and to allow the door to swing outward during deployment of the airbag.

9. An instrument panel for an automotive vehicle having an airbag chute assembly, comprising:
   an outer skin;
   an instrument panel structure having an opening formed therein adapted to allow an airbag chute assembly to extend outward through the opening;
   a foam in place filler between the outer skin and the instrument panel structure; and
   an airbag chute assembly aligned with the opening within the instrument panel structure and vibration welded to an inner surface of the instrument panel structure, the airbag assembly including:
      a rigid chute frame;
      a door;
      a seal off rib extending outward from a front surface of the rigid chute frame and extending around the door; and
      at least one hinge interconnecting the door to the rigid chute frame;
      wherein, the rigid chute frame, the seal off rib and the door are unitarily injection molded from a thermoplastic polyolefin material, and wherein the front surface of the airbag chute assembly is vibration welded to the inner surface of an instrument panel structure, and the seal off rib is adapted to provide a seal between the inner surface of the instrument panel structure and the airbag chute assembly to prevent the foam in place filler from leaking between the airbag chute assembly and the inner surface of the instrument panel.

10. The instrument panel of claim 9, wherein the at least one hinge extends along a first portion of an outer periphery of the door, the airbag chute assembly further including a tear seam unitarily formed along with the rigid chute frame and the door from a thermoplastic polyolefin material, the tear seam extending around a second portion of the outer periphery of the door and interconnecting the door to the rigid chute frame, the tear seam having a residual wall thickness geometry adapted to allow the tear seam to separate, detaching the second portion of the outer periphery of the door from the rigid chute frame during deployment of an airbag.

11. The instrument panel of claim 10, wherein:
   the door includes a first door section and a second door section; and
   the at least one hinge includes a first hinge interconnecting the first door section to the rigid chute frame along a first edge of the first door section, and a second hinge interconnecting the second door section to the rigid chute frame along a first edge of the second door section; and
   the tear seam extends:
      between and interconnecting the first door section to the rigid chute frame along second and third sides of the first door section;
      between and interconnecting the second door section to the rigid chute frame along second and third sides of the second door section; and
      between and interconnecting the first door section to the second door section along fourth sides of the first and second door sections.

12. The airbag chute assembly of claim 10, wherein the rigid chute frame includes a plurality of insert molded mounting studs adapted to support an airbag module.

13. The airbag chute assembly of claim 10, wherein the rigid chute frame includes a structure that is substantially rigid and the at least one hinge has a residual wall thickness geometry that is adapted to prevent the at least one hinge from tearing during deployment of an airbag and to allow the door to swing outward during deployment of the airbag.

14. An airbag chute assembly for an automotive vehicle, comprising:
a rigid chute frame having a structure that is substantially rigid;
a door;
at least one hinge extending along a first portion of an outer periphery of the door and interconnecting the door to the rigid chute frame, the at least one hinge having a residual wall thickness geometry that is adapted to prevent the at least one hinge from tearing during deployment of an airbag and to allow the door to swing outward during deployment of the airbag;
a tear seam extending around a second portion of the outer periphery of the door and interconnecting the door to the rigid chute frame, the tear seam having a residual wall thickness geometry adapted to allow the tear seam to separate, detaching the second portion of the outer periphery of the door from the rigid chute frame during deployment of an airbag;
a seal off rib extending outward from a front surface of the rigid chute frame and extending around the door, the front surface of the airbag chute assembly adapted to be vibration welded to an inner surface of an instrument panel structure, and the seal off rib is adapted to provide a seal between the inner surface of the instrument panel structure and the airbag chute assembly when the airbag chute assembly is vibration welded to the inner surface of the instrument panel structure; and
a plurality of mounting studs insert molded into the rigid chute frame and adapted to support an airbag module;
wherein, the rigid chute frame, the door, the tear seam and seal off rib are unitarily injection molded from a thermoplastic polyolefin material.

15. The airbag chute assembly of claim 14, wherein:
the door includes a first door section and a second door section; and
the at least one hinge includes a first hinge interconnecting the first door section to the rigid chute frame along a first edge of the first door section, and a second hinge interconnecting the second door section to the rigid chute frame along a first edge of the second door section; and
the tear seam extends:
between and interconnecting the first door section to the rigid chute frame along second and third sides of the first door section;
between and interconnecting the second door section to the rigid chute frame along second and third sides of the second door section; and
between and interconnecting the first door section to the second door section along fourth sides of the first and second door sections.

\* \* \* \* \*